United States Patent [19]

Jung et al.

[11] Patent Number: 4,701,430

[45] Date of Patent: Oct. 20, 1987

[54] HYDROGENATION CATALYST AND METHODS FOR ITS PREPARATION AND USE TO CONVERT SILICON TETRACHLORIDE TO CHLOROSILANE AND SILANE

[75] Inventors: Il N. Jung; Ko D. Cho, both of Seoul, Rep. of Korea; John C. Lim, Claremont, Calif.; Bok-Ryul Yoo, Kyungki, Rep. of Korea

[73] Assignee: Korea Advance Institute of Science & Technology, Seoul, Rep. of Korea

[21] Appl. No.: 895,139

[22] Filed: Aug. 11, 1986

Related U.S. Application Data

[62] Division of Ser. No. 733,883, May 14, 1985, Pat. No. 4,613,491.

[30] Foreign Application Priority Data

May 17, 1984 [KR] Rep. of Korea .............................. 2677
May 17, 1984 [KR] Rep. of Korea .............................. 2678

[51] Int. Cl.$^4$ .......................... B01J 29/06; B01J 31/02

[52] U.S. Cl. ..................................... 502/62; 502/159; 502/164

[58] Field of Search .......................... 502/62, 159, 164

[56] References Cited

FOREIGN PATENT DOCUMENTS 7121602 9/1966 Japan ..................................... 502/164
70344 5/1980 Japan ..................................... 502/164

Primary Examiner—Patrick P. Garvin
Attorney, Agent, or Firm—Plante, Strauss & Vanderburgh

[57] ABSTRACT

There is disclosed a redistribution catalyst which is the reaction product of a quaternary ammonium halide salt or tertiary amine, and an inorganic carrier having surface hydroxyl groups, such as silica, zeolite, clays, and silicone resins. The catalyst is useful for the redistribution of chlorosilicon hydrides to dichlorosilane and silane at reaction conditions of a temperature from 0° to about 200° C., and a pressure from about 0.1 to 10 atmospheres, in liquid or vapor phase.

18 Claims, No Drawings

HYDROGENATION CATALYST AND METHODS FOR ITS PREPARATION AND USE TO CONVERT SILICON TETRACHLORIDE TO CHLOROSILANE AND SILANE

This is a division of application Ser. No. 733,883, filed May 14, 1985, now U.S. Pat. No. 4,613,491.

BACKGROUND OF THE INVENTION

1. Field of the Invention

This invention relates to immobilized catalysts on inorganic carriers such as silica, their preparation and their use for disproportionation of chlorosilicon hydrides to silane.

2. Description of the Prior Art

The addition of chlorosilicon hydrides to various unsaturated organic compounds offers a synthetic route to many organochlorosilanes which are useful for many industrial purposes (E. Y. Lukevitts and M.. G. Voronkov, "Organic Insertion Reactions of Group IV Elements", Consultants Bureau, New York, 1966). In particular, trichlorosilane is commercially used as the starting material for the production of very high purity silicon for the electronics industries (F. A. Padorvani, U.S. Pat. No. 4,092,466). The pyrolysis of chlorosilane to metallic silicon is known as Siemens Process. Extensive developmental work has been recently conducted to reduce the energy costs for that process by substituting trichlorosilane with other silanes such as dichlorosilane or silane which decompose at lower temperature than trichlorosilane (L. H. Coleman, U.S. Pat. No. 4,340,574). Union Carbide Corporation has patented a process which incorporates redistribution of chlorosilanes to silane and silane decomposition.

Chlorosilicon hydrides such as chlorosilanes can be prepared by reacting metallic silicon directly with hydrogen chloride in the presence of copper catalyst. This process is commercially performed using a fluidized-bed reactor to control the reaction temperature, because it is exothermic. The reaction temperature is controlled carefully to maximize the yield of trichlorosilane, for otherwise, tetrachlorosilane will be the major product. With careful control of the process, trichlorosilane can be obtained up to 80% of the products and silicon tetrachloride will be about 15%. However, the reaction gives only trace amount of dichlorosilane which is expected to be the major product. This is why dichlorosilane is usually prepared by redistributing trichlorosilane (C. J. Litteral, U.S. Pat. No. 4,113,845).

The Lewis acid type catalysts such as aluminum trichloride, boron trichloride, etc. are reported to be active for the disproportionation of chlorosilanes, e.g. see U.S. Pat. Nos. 2,627,451 and 2,735,861. Organic compounds such as tertiary amines, quaternary ammonium compounds, nitrile compounds, phosphines, etc. are also suggested in U.S. Pat. Nos. 2,732,282 and 3,928,542 as catalysts for the reactions, such as the following:

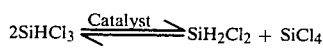

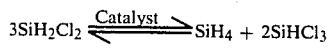

The reaction, however, requires the reaction temperatures as high as 200° C. and the reactor must be kept under high pressure because of the low boiling points of the chlorosilanes. Temperatures greater than 300° C. are also required for the catalysts of alkaline metal salts, as shown by M. Kinger in U.S. Pat. No. 3,627,501. Because of the harsh conditions of temperature and pressure, these inorganic compounds are unsuited for a continuous type industrial process.

Although the reaction proceeds at relatively lower temperature with organic catalysts, than with inorganic catalysts, very efficient distillation is required to separate the organic catalyst from the products since the organic catalysts are usually used as homogeneous, soluble catalysts.

Union Carbide's U.S. Pat. No. 3,928,542 to C. Bakey and U.S. Pat. No. 4,113,845 to C. Litteral disclose the use of various, solid amine ion exchange resins for the disproportionation of chlorosilane, thereby immobilizing the catalyst for hetergeneous catalysis. One of the important, immobilized catalysts developed commercially for this purpose is Amberyst A-21, a trade mark of Rohm and Hass company, Philadephia Pa. This catalyst is a macroreticular styrene divinylbenzene copolymer resin bearing pendant benzyldimethylamine groups. Union Carbide Corporation has also patented the processes for the redistribution of trichlorosilanes, using Amberyst A-26 or Amberitre IRA-400, which are ion exchange resins that are exchanged with quarternary ammonium compounds.

The commercial catalyst for the disproportionation of chlorosilanes has several disadvantages. Because the catalyst is a benzyl amine or ammonium complex, gradual degradation takes place due to the loss of the amine group from the benzyl sites. In addition, the organic backbone of a styrene divinylbenzene copolymer is susceptible to swelling and shrinking. This mandates very careful control of the composition of reaction stoichiometry and temperature to prevent restrictions in flow through the reactor catalyst beds.

Inorganic materials such as silica, zeolite, etc. have hydroxyl groups on the surface that can be used as the site to couple with organotrialkoxysilanes, as suggested by F. R. Hartley and P. N. Vezey, Adv. in Organometal. Chem., V 15, 189 (1978). Treating inorganic fillers with coupling agents is being commercially practiced in the plastic industries.

BRIEF DESCRIPTION OF THE INVENTION

We have found that certain inorganic materials, which have surface hydroxyls available for reaction may be treated with certain tertiary amine or quaternary ammonium salt substituted alkyl alkoxysilane compounds to produce a very stable catalyst which is very useful in the redistribution of chlorosilicon hydrides to silane, at mild conditions. As the catalyst is quite stable it is well suited for use in a packed reactor for continuous flow processes.

DESCRIPTION OF PREFERRED EMBODIMENTS

This invention comprises the preparation of a catalyst by the reaction of certain inorganic materials, which have surface hydroxyls available for the reaction, with with certain tertiary amine or quaternary ammonium salt substituted alkyl alkoxysilane compounds of the following General Formula I:

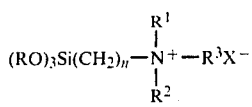

wherein:

n is 1 to 4;

R is alkyl having 1 to 4 carbons;

R$_1$ and R$_2$ are the same or different alkyl or aryl groups having 1 to 8 carbons;

R$_3$ is an alkyl- or dialkyl-amino substituted alkyl having 1 to 20 carbons, with the alkyl groups of the amino group being monovalent alkyl or heterocyclic ring having 1 to 10 carbons; and X is chloride, iodide, or bromide.

The reaction proceeds generally as set out in the following equation:

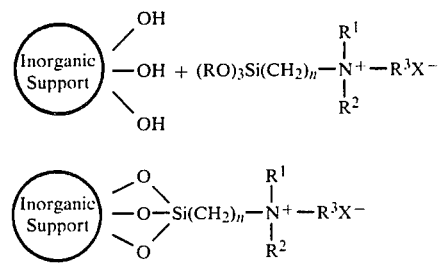

The reaction gives new immobilized catalysts for the disproportionation of chlorosilicon hydrides to silane, and the invention also comprises these new catalytic compositions. Since the densities of these immobilized catalysts are higher than the organic solid catalysts, it is easier to pack them in a reactor without creating high pressure drop for continuous flow processes. The degradation problem of the amino groups is reduced because the inorganic material is chemically bound with the amino sites through aliphatic chain. Accordingly, the invention also comprises the method of using these new catalytic compositions as catalysts in the redistribution of chlorosilicon hydrides to silane.

The compounds of general formula I can also be converted to a solid resin catalysts by cohydrolyzing with the compounds of following, General Formula 2 without reacting with inorganic supports.

General formula 2:

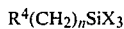

wherein:

n is 1 to 4;

X is halide or alkoxy having 1 to 4 carbons; and

R$^4$ is hydrogen, alkyl, or aryl having a functional group of the class of —SH, —CN,

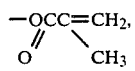

pyrrolidine, and alkyl amino having 1 to 4 carbons.

The reaction proceeds in accordance with the following equation:

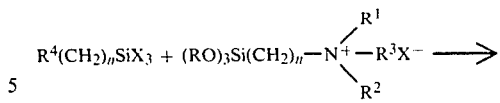

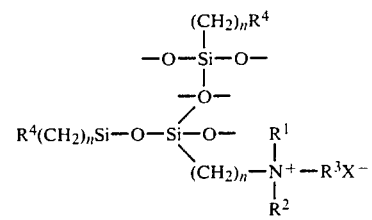

The compound represented in General Formula 1 and silica gel may be reacted and coupled with each other through chemical bond by hydrolyzing in 40–70% methanol solution of the compound on the surface of silica gel. The reaction proceeds faster when dilute hydrochloric acid solution is used for the hydrolysis. A certain amount of the tertiary amine substituted compound as represented in General Formula 2 may be used in combination with the above compound for the hydrolysis. The solid catalysts obtained from the hydrolysis may be filtered, washed with absolute ethanol, and dried at the temperature below 150° C. in a vacuum oven.

Zeolite 13X may be treated with an ammonium chloride solution to replace sodium with ammonium ions. The ammonium exchange zeolite is heated to de-ammoniate the solid in the manner described by D. W. Breck, "Zeolite Molecular Sieves", Wiley, New York 1974. This zeolite may be used as the support for immobilizing amines. When the amine substituted organosilicon compounds are hydrolyzed on this zeolite, dibutyltindilaurate can be used as a catalyst for the coupling between the support and organosilicon compound.

The solid silicon resin can be prepared by cohydrolyzing a methanol solution of compound represented as a general formula 1 and compound represented in general formula 2 in the presence of dilute hydrochloric acid. The resulting solid is filtered, washed twice with absolute ethanol, and dried in vacuum oven to give the tertiary amine and quarternary ammonium salt, immobilized catalyst on a solid silicon resin.

One of the advantages of the novel catalysts of this invention is that the pressure drop problem of the catalytic bed can be easily solved by choosing the appropriate form of inorganic supports which are commercially available and have higher densities than organic materials. The catalysts are suitable for the batch or continuous process of the disproportionations of chlorosilanes.

The disproportionation process using the catalysts of this invention may be practiced at temperatures as low as about 0° C. to as high as about 200° C., although the preferred operating temperatures are typically about 20° C. to about 100° C.

The process may be carried out under subatmospheric, atmospheric, or superatmospheric pressure. Since the boiling points of chlorosilicon hydrides are relatively low, pressure must be applied in order to maintain a liquid phase process in which these silanes are present at the temperature range. The process, however, can be carried out in liquid phase or in vapor phase, preferably using a continuous flow process. Useful pressures are from about 0.1 to about 10 atmospheres, preferably from about 0.5 to about 5 atmospheres. If desired, an inert gas can be introduced to carry or sweep the reactants through the reactor, particularly when operating in the vapor phase. Suitable gases for this purpose are nitrogen, argon, and mixtures thereof.

Beside the temperature and pressure of the process, another critical factor is the contact time between the immobilized catalyst and the silane. At a given temperature, there is an independent period of time in which such monomer feed should be in contact with the catalysts to reach ultimate equilibrium. In a batch process the equilibrium is the function of the catalyst concentration. In a continuous process the required contact time can be obtained by increasing the length of catalytic bed and/or by reducing the flow rate of feed. For most reactions, the space velocity, expressed as cubic meters of reactant per hour per cubic meter of catalyst can be from 10 to about 150, preferably from about 40 to about 60.

The invention will be further illustrated by the following examples. It is, however, not intended that this invention will be limited by the examples.

EXAMPLE 1

To a one liter, three-neck, round-bottomed flask equipped with a mechanical stirrer, a dropping funnel, and a reflux condenser, are added 200 grams of silica gel flake and 200 grams (0.16 moles) of 40 weight percent solution of 3-trimethoxysilylpropyloctadecyldimethyl ammonium chloride in methanol. To this mixture, 300 milliliters of water acidified with a few drops of concentrated hydrochloric acid was then added dropwise with stirring through the dropping funnel. The solution was stirred for another hour after the addition. The solid was filtered and washed twice with 200 milliliters of absolute ethanol, and then, 200 milliliters of benzene was added to the catalyst and the catalyst was dried by distilling a benzene-water azeotrope to give 256 grams of the product.

EXAMPLE 2

To a 300 milliliter pyrex glass tube (400×250 nm.) fitted with a Corning Rotaflo stopcock, were charged 100 grams of the immobilized catalyst prepared in example 1 and 150 milliters of trichlorosilane. After the Teflon stopcock was closed, the solution was heated to 100° C. for one hour to give 80.9% HSiCL$_3$, 9.52% SiCl$_4$, 8.81% H$_2$SiCl$_2$ and 0.24% H$_2$SiCl, according to the gas chromtogram.

EXAMPLE 3

100 grams (0.16 moles) of 40% methanol solution of 3-trimethoxysilyl-propyltrimethyl-ammonium chloride was reacted with 200 grams of silica gel as described in example 1 to prepare trimethyl-ammonium chloride immobilized catalyst.

EXAMPLE 4

Dichlorosilane was disproportionated in the reactor used in Example 2 using the catalyst prepared in example 3 to give 10.6% SiH$_4$, 27.0% SiCl$_3$, 16.8% SiH$_3$Cl, and 0.2% SiCl$_4$.

EXAMPLE 5

The reactor for the continuous disproportion at above the boiling point of trichlorosilane was constructed with 316 type stainless steel tube 60 milliliters long with a 1.2 millimeter diameter. Three hundred grams of the catalyst prepared in Example 1 was charged to the reactor and heated to 80° C. by using heating tape. SiHCl$_3$ was fed as vapor to the reactor through a vaporizer that was preheated to 60° C. and the flow was controlled to provide 20 to 30 minutes of contact time. The products obtained were analyzed by on-line gas chromatography to determine their composition to be 4 to 8% H$_2$SiCl$_2$, 6 to 12% SiCl$_4$, and 0.02 to 0.03% SiH$_3$Cl.

EXAMPLE 6

0.01 moles of dimethylaminopropyltrimethoxysilane and 0.16 moles of 3-trimethoxysilyl-propyloctadecyldimethyl-ammonium chloride were mixed and coupled with 200 grams of silica gel using the same procedure described in Example 1.

EXAMPLE 7

To a solution of 0.05 moles of 3-trimethoxysilyl-propyloctadecyldimethyl-ammonium chloride in 38 grams of methanol was added 94 grams (0.5 moles) of 3-cyanopropyltrimethoxysilane. To the stirred mixture was added 300 milliliters of water. After stirring the solution for one hour, an additional 100 milliliters of 1N hydrochloric acid solution was added and the mixture was refluxed for 30 min. to complete the hydrolysis. The resulting solid resin was filtered and washed twice with 200 milliliters of absolute ethanol, and then dried in a vacuum oven.

EXAMPLE 8

The catalyst prepared using this procedure is described in Example 1 except 3-trimethoxysilyl-propylactedecyldimethyl ammonium chloride was replaced by 3-trimethoxysilyl-propylbenzyldimethyl ammonium chloride.

EXAMPLE 9

The catalyst was prepared using the same procedure as described in Example 6 except dimethyl propyl trimethoxy silane was replaced by 0.01 moles of pyrrolydil-propyl trimethoxysilane.

EXAMPLE 10

To a solution of 29 grams of ammonium chloride in 120 milliliters of water was added 1200 grams of zeolite (13X) pellet to replace the sodium ions of the zeolite with ammonium ions. The solution was warmed to 80° C. and left for 2 hours. The pellet was then filtered and soaked in another ammonium chloride solution as described above.

The ammonium exchange zeolite was filtered, dried at 100° C. in an oven for one hour, and baked at 300°–400° C. for two hours to decompose the ammonia from the zeolite.

The zeolite was used as the inorganic support for immobilizing amine catalysts as described in Examples 1 and 6.

EXAMPLE 11

The procedure of Example 1 was repeated using a methanol solution of 3-trimethoxysilyl-tetramethylene propylamine, to prepare a catalyst bonded to a silica gel support. This catalyst was identified as KD-1 and used in a series of disproportionation reactions, at varied temperatures and residence time (flow rates). The results are presented in Table 1.

EXAMPLE 12

The procedure of Example 11 was followed, however, Chromosorb P, a commercially available form of spherical granules, was substituted for the silica gel. The catalyst was identified as KD-2 and used in the series of disproportionation reactions, with the results reported in Table 1.

EXAMPLE 13

The procedure of Example 11 was again followed, however, an ammonium charge zeolite 4A was substituted for the silica gel used in Example 11. The ammonium zeolite was prepared by the procedure described in Example 10. The resultant solid was recovered, dried and used in the series of disproportionation reactions, with the results reported in Table 1.

EXAMPLE 14

The catalysts prepared in Examples 11–13 were tested in a continuous flow reactor substantially as described in Example 5, together with catalysts which were prepared as described in Example 1 (KD-3) and in Example 3 (KD-4). All the catalysts were tested for the disproportionation of dichlorosilane at a reaction temperature of 65° C., and at a rotometer flow rate of 25, corresponding to a space velocity of 20.6 cubic meters per hour per cubic meter of catalyst. The pressure was maintained from 25 to about 35 psi., to insure that the reactants and products were entirely in vapor phase. The results which were obtained are reported in the following Table 1:

TABLE 1

| Catalyst | $SiH_4$ | $H_3SiCl$ | $H_2SiCl_2$ | $HSiCl_3$ | $SiCl_4$ |
|---|---|---|---|---|---|
| KD-1 | 16.1 | 10.8 | 34.2 | 38.2 | 0.7 |
| KD-2 | 13.2 | 14.1 | 36.3 | 36.0 | 0.5 |
| KD-3 | 17.1 | 9.8 | 32.8 | 39.6 | 0.7 |
| KD-4 | 6.5 | 16.8 | 49.6 | 27.0 | 0.2 |
| KD-5 | 16.0 | 10.8 | 34.4 | 38.2 | 0.5 |

The results obtained indicate that the catalyst has a high activity for the disproportionation of chlorosilanes.

The invention is intended to be unduly limited by the disclosure of the presently preferred embodiments which are illustrated by the specific examples. Instead, the invention is intended to be defined by the agents, and method steps, and their obvious equivalents, set forth in the following claims:

What is claimed is:

1. A catalytic composition for the disproportionation of chlorosilicon hydrides which comprises the solid reaction product of from 5 to 75 weight percent of:

(a) an active catalytic ingredient having the formula:

$$(RO)_3Si(CH_2)_n-\overset{R^1}{\underset{R^2}{N^+}}-R^3 X^-$$

wherein:

n is 1 to 4;

R is alkyl having 1 to 4 carbons;

$R_1$ and $R_2$ are the same or different alkyl or aryl groups having 1 to 8 carbons;

$R_3$ is an alkyl- or dialkyl-amino substituted alkyl having 1 to 20 carbons, with the alkyl groups of the amino group being monovalent alkyl or heterocyclic ring having 1 to 10 carbons; and X is chloride, iodide, or bromide; and (b) the balance being a silicon containing carrier selected from the class consisting of: (i) a surface hydroxyl bearing solid selected from the class consisting of silica, zeolite, clay, solid silicone resin, and the hydrolyzed solid of silicon compounds having the formula:

$$R^4(CH_2)_n SiX_3$$

wherein:

n is 1 to 4;

X is halide or alkoxy having 1 to 4 carbons; and $R^4$ is hydrogen, alkyl, or aryl having a functional group of the class of —SH, —CH,

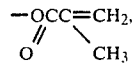

pyrrolidine, and alkyl amino having 1 to 4 carbons; and (c) mixtures thereof.

2. The catalytic composition of claim 1, wherein the silicon containing inorganic material is a surface hydroxyl bearing solid.

3. The catalytic composition of claim 2 wherein said solid is silica.

4. The catalytic composition of claim 3 wherein said active ingredient is 3-trimethoxysilylpropyloctadecyldimethyl ammonium chloride.

5. The catalytic composition of claim 3 wherein said active ingredient is 3-trimethoxysilylpropyltrimethoxy ammonium chloride.

6. The catalytic composition of claim 4 also including the hydrolyzed product of dimethylaminopropyltrimethoxysilane.

7. The catalytic composition of claim 4 also including the hydrolyzed product of pyrrolydil-propyl trimethoxysilane.

8. The catalytic composition of claim 4 wherein said silicon containing carrier is the hydrolyzed product of 3-cyanopropyltrimethoxysilane.

9. The catalytic composition of claim 8 wherein said active catalytic ingredient is present at a concentration from 5 to about 20 weight percent.

10. The method for the preparation of a catalyst which comprises hydrolyzing, in a dilute aqueous, mineral acid, a mixture of:

(1) an active catalytic ingredient having the formula:

$$(RO)_3Si(CH_2)_n-\overset{R^1}{\underset{R^2}{N^+}}-R^3 X^-$$

wherein:

n is 1 to 4;

R is alkyl having 1 to 4 carbons;

$R_1$ and $R_2$ are the same or different alkyl or aryl groups having 1 to 8 carbons;

$R_3$ is a alkyl- or dialkyl-amino substituted alkyl having 1 to 20 carbons, with the alkyl groups of the amino group being monovalent alkyl or heterocyclic ring having 1 to 10 carbons; and X is chloride, iodide, or bromide; and (b) a silicon containing a compound in a proportion from 0.01 to 10 mols per mol of said active catalytic ingredient, said silicon containing compound having the formula:

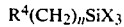

wherein:

n is 1 to 4;

X is halide or alkoxy having 1 to 4 carbons; and $R^4$ is hydrogen, alkyl, or aryl having a functional group of the class of —SH, —CN,

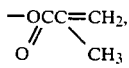

pyrrolidine, and alkyl amino having 1 to 4 carbons; and recovering and drying the solid product obtained from the hydrolysis.

11. The method of claim 10 wherein said active ingredient is 3-trimethoxysilylpropyloctadecyldimethyl ammonium chloride.

12. The method of claim 10 wherein said active ingredient is 3-trimethoxysilylpropyltrimethyl ammonium chloride.

13. The method of claim 10 wherein said silicon compound is dimethylaminopropyltrimethoxysilane.

14. The method of claim 10 wherein said silicon compound is pyrrolydil-propyl trimethoxysilane.

15. The method of claim 10 wherein said silicon compound is 3-cyanopropyltrimethoxysilane.

16. The method of claim 10 wherein said active catalytic ingredient is present at a concentration from 5 to about 20 weight percent.

17. The method of claim 10 wherein said hydrolysis is performed in the presence of from 10 to about 90 weight percent of a hydroxyl containing solid selected from the class consisting of silica, zeolite, clay and solid silicon resin.

18. The method of claim 17 wherein said hydroxyl containing solid is silica gel.

* * * * *

UNITED STATES PATENT AND TRADEMARK OFFICE
CERTIFICATE OF CORRECTION

PATENT NO. : 4,701,430
DATED : October 20, 1987
INVENTOR(S) : Il N. Jung et al

It is certified that error appears in the above—identified patent and that said Letters Patent is hereby corrected as shown below:

In the claims:

Column 8, line 17, change "-CH" to -- -CN --
Column 8, line 35, change "3-trimethoxysilylpropyltrimethoxy" to
    --3-trimethoxysilylpropyltrimethyl--

Column 9, line 1, after containing, delete "a"

Signed and Sealed this

Twelfth Day of April, 1988

Attest:

DONALD J. QUIGG

*Attesting Officer*    *Commissioner of Patents and Trademarks*